(12) United States Patent
Motl

(10) Patent No.: US 6,938,527 B2
(45) Date of Patent: Sep. 6, 2005

(54) MATERIAL STOCK ADVANCING APPARATUS AND METHOD

(76) Inventor: Daniel Wayne Motl, 1961 130th La., NW., Coon Rapids, MN (US) 55448

( * ) Notice: Subject to any disclaimer, the term of this patent is extended or adjusted under 35 U.S.C. 154(b) by 0 days.

(21) Appl. No.: 10/698,156

(22) Filed: Oct. 31, 2003

(65) Prior Publication Data

US 2005/0092145 A1 May 5, 2005

(51) Int. Cl.[7] .............................................. B23B 13/00
(52) U.S. Cl. ............................. 82/124; 82/126; 82/127; 82/165
(58) Field of Search ......................... 82/124, 126, 127, 82/165

(56) References Cited

U.S. PATENT DOCUMENTS

| | | |
|---|---|---|
| 2,327,916 A | 8/1943 | Martotte |
| 3,565,284 A | 2/1971 | Hinterreiter |
| 3,917,143 A | 11/1975 | Yourkievitz |
| 4,040,556 A | 8/1977 | Dahle |
| 4,061,061 A * | 12/1977 | Lahm et al. ................... 82/127 |
| 4,163,514 A | 8/1979 | Ramunas |
| 4,187,748 A | 2/1980 | Evans |
| 4,221,141 A * | 9/1980 | Oliver .......................... 82/127 |
| 4,421,446 A * | 12/1983 | Leon et al. .................... 414/17 |
| 4,445,697 A | 5/1984 | Evans |
| 4,466,555 A | 8/1984 | Yarnitsky et al. |
| 4,672,869 A | 6/1987 | Hasslauer et al. |
| 4,889,024 A * | 12/1989 | Geiser et al. .................. 82/127 |
| 5,195,409 A * | 3/1993 | Smith ........................... 82/127 |
| 6,095,022 A * | 8/2000 | Lasi et al. ..................... 82/127 |
| 6,227,084 B1 | 5/2001 | Cucchi |

* cited by examiner

Primary Examiner—Willmon Fridie, Jr.
(74) Attorney, Agent, or Firm—Michael A. Mochinski

(57) ABSTRACT

A material stock advancing apparatus for use with a turning and milling machine having a computerized numeric controller or lacking programmable capabilities. The material stock advancing apparatus generally comprising an elongate body of cylindrical form having first and second ends and an interior chamber for housing therein a plunger assembly operably working therewithin. The second end comprising means for attaching the elongate body to an external holding device such as a collet or chuck adapter seated in a headstock spindle assembly. The first end comprising an end plug having a threaded section situated in between external and internal ends thereof, with the threaded section being threadably attached to the first end to permit the internal end to substantially engage a portion of the plunger assembly and ensure proper axial positioning of the plunger assembly during cyclic operation. The plunger assembly comprising a ram operably acting longitudinally within the interior chamber of the elongate body via biasing means comprising at least one spring operably acting in conjunction with controller means used in opening and closing the external holding device, which collectively controls the advancement of material stock toward and beyond the second end to permit the machining thereof for conversion into a useful product.

28 Claims, 13 Drawing Sheets

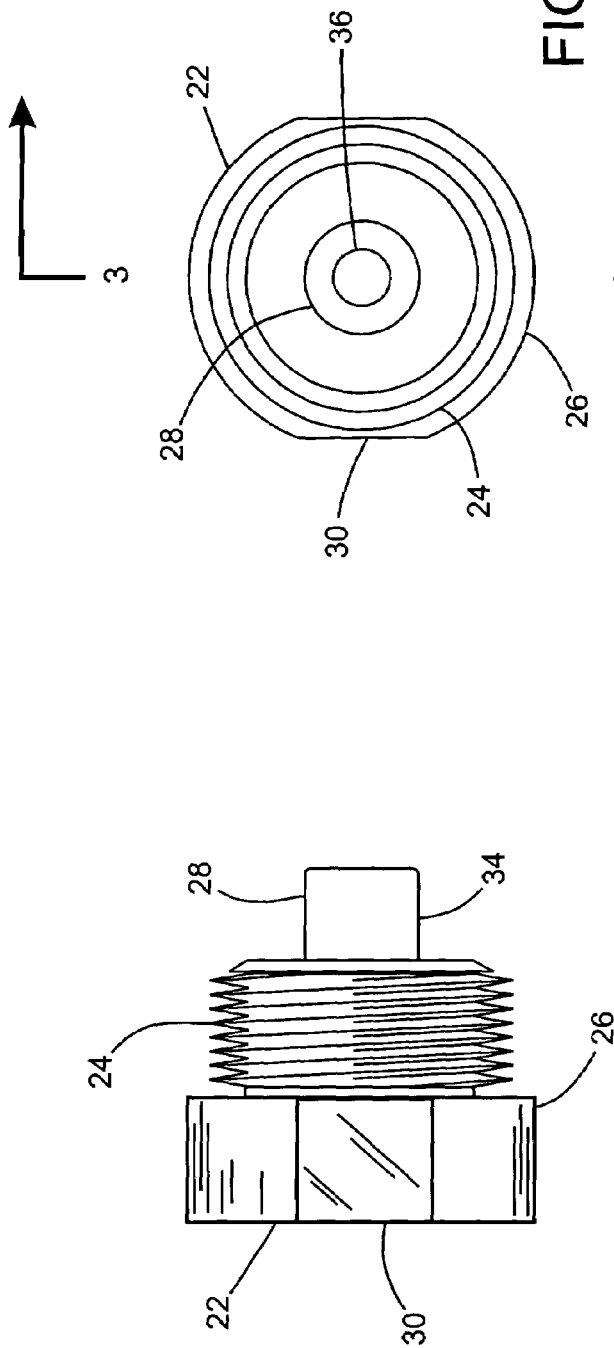
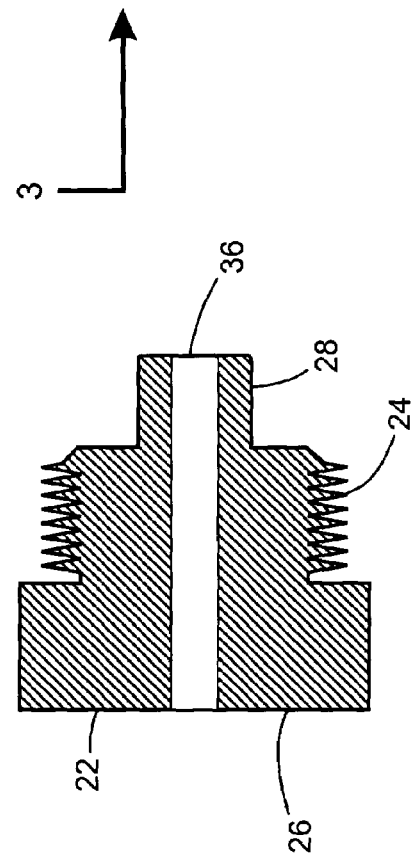
FIG. 2
FIG. 3
FIG. 4

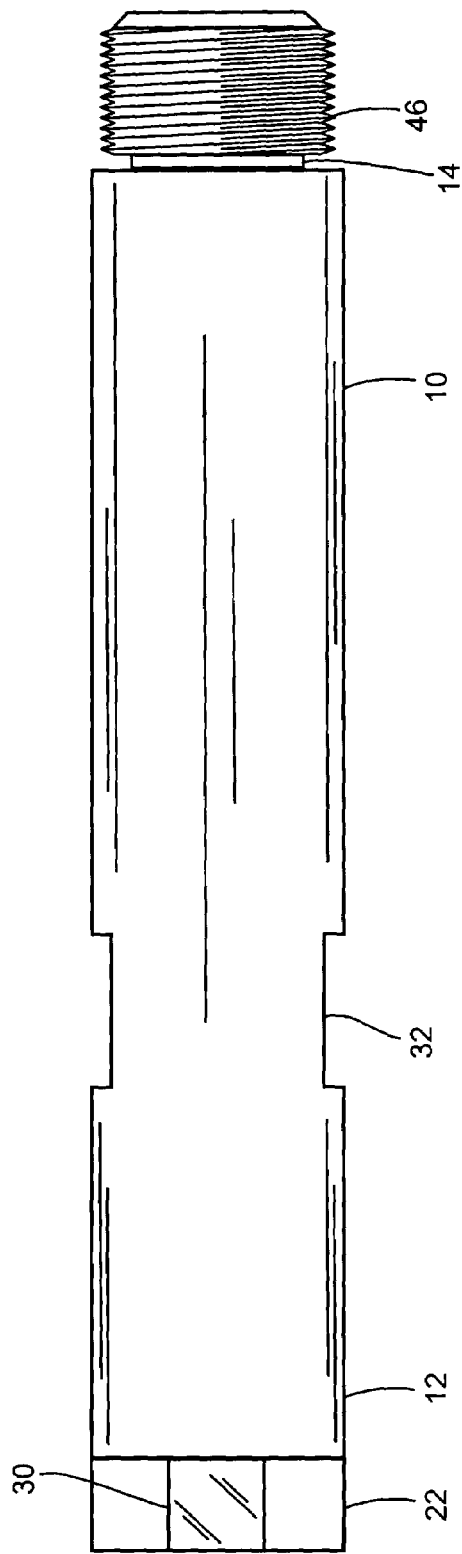
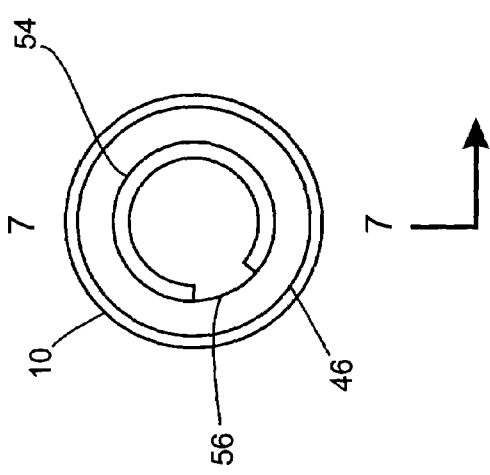
FIG. 5
FIG. 6

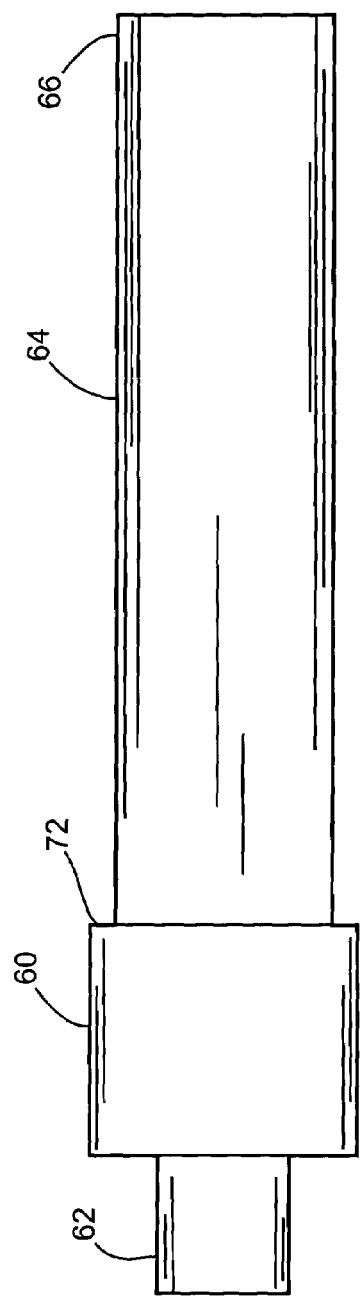
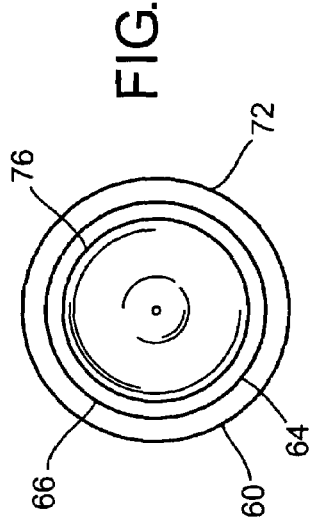
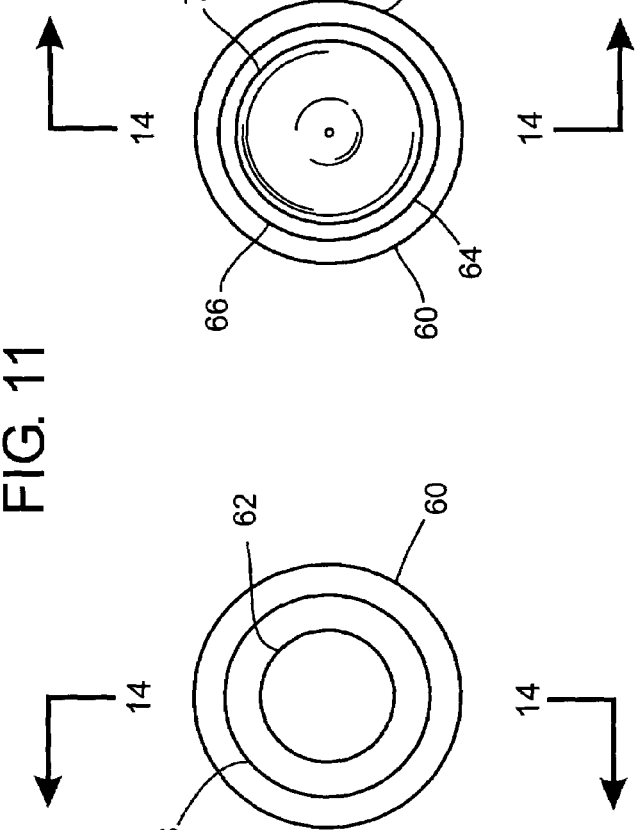
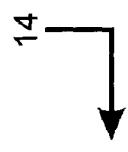
FIG. 11
FIG. 12
FIG. 13

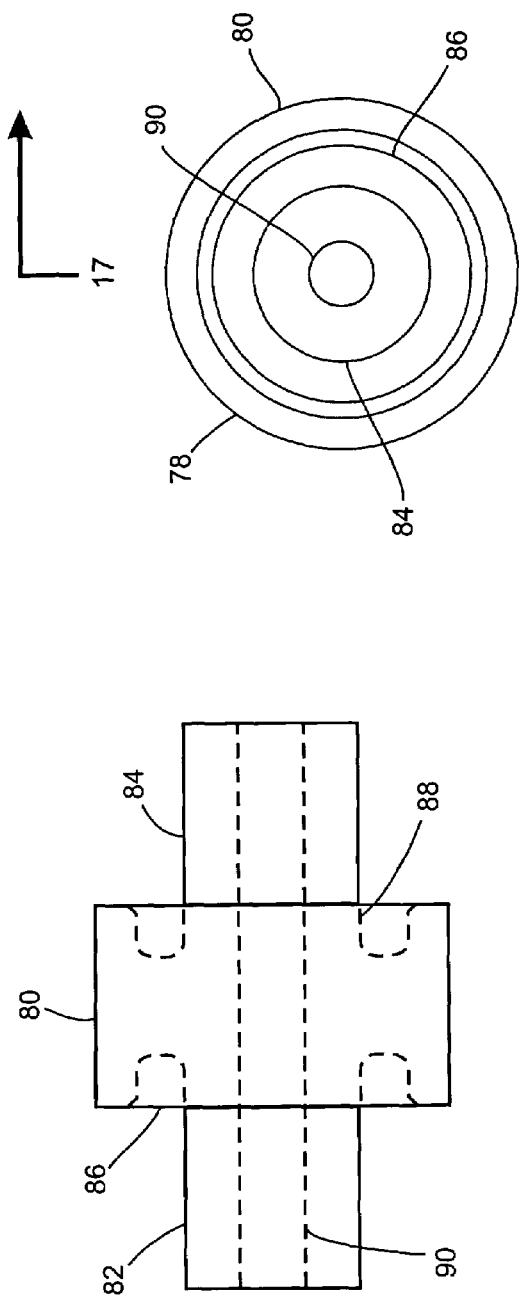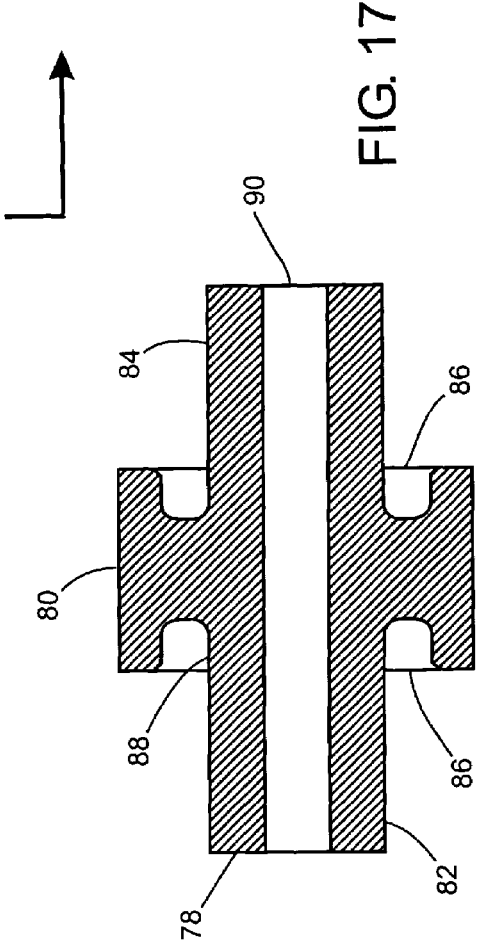

US 6,938,527 B2

MATERIAL STOCK ADVANCING APPARATUS AND METHOD

FIELD OF THE INVENTION

The present invention relates in general to an improved apparatus and method of advancing material stock during machining operations. More particularly, the present invention relates to an improved apparatus configurably arranged to cooperate with a headstock spindle assembly generally made part of a turning and milling machine, such as a stand-alone lathe operable with or without a computerized numeric controller.

BACKGROUND OF THE INVENTION

Computerized numerical controlled (CNC) machines are unique automated machines capable of forming small intricate end-use products from material stock with great precision and accuracy. As with all CNC machining operations, the ability to control output in terms of an acceptable finished product for the least amount of cost is of the utmost importance to today's production shop. To realize this goal as well as others, the CNC machine is typically fine tuned to the extent of programming the controller for intricate manipulation of the tooling rack in specified axial directions (X, Y, and Z axes or a combination of each), spindle speed and direction (fast or slow, forward or reverse), coolant flow (on or off), and material feed rate (fast or slow), to name a few programmable features of today's most advanced CNC machines.

Besides the most noted programmable features and operable components inherently made part of the CNC machine, the CNC machine may require the presence of operable external means for feeding material stock into and through the headstock spindle assembly. The most primitive approach may involve operator placement of material stock into the headstock spindle assembly of equivalent length and upon completion of interim machining operations, push or grab the material stock through the spindle assembly to permit further machining thereof or subsequent extraction of the finished product. Although this approach may be suitable for CNC machining operations involving low production runs, it is most commonly employed with turning and milling machines lacking programmable capabilities, such as a manually operated lathe having chucking means made available for supporting and holding the workpiece during machining operations. A more sophisticated approach, on the other hand, may utilize a bar feeder having ample storage capacities and automated means for loading and advancing the material stock into and through the headstock spindle assembly, respectively. An alternative approach for feeding material stock, generally of equivalent sophistication as a bar feeder but lacking ample capacity, may involve the use of a bar puller which pulls on the material stock rather than pushing it through the headstock spindle assembly. In typical applications, the bar puller is generally positioned at the machine's turret station, laterally away from the headstock spindle assembly.

Because of the inherent desire to maximize profit, the production shop often avails itself to the use of automated equipment, such as bar feeders having ample capacities and more or less automated features to cooperate with those most notably present in the CNC machine. However, in some instances, the use of automated bar feeders of the type noted herein can be cost prohibitive in terms of capital investment, operating cost, downtime for changeover and adjustments, spatial requirements, and so forth. Conversely, the simple placement and movement of material stock by operator means may fail to meet the timely demands and requirements of today's production shop.

Accordingly, there remains a need for a material advancing apparatus capable of cooperating with the operable components of the turning and milling machine, regardless of its programmable capabilities, to yield finished parts and the like within reasonable timeframes and of acceptable quality without the undue costs and spatial requirements often associated with prior art devices.

BRIEF SUMMARY OF THE INVENTION

In order to overcome the numerous drawbacks apparent in the prior art, an improved material advancing apparatus has been devised for use with a turning and milling machine, specifically of the lathe type having the presence of a computerized numeric controller or lacking programmable capabilities such as those inherently operated by manual means.

It is thus an object of the present invention to provide a low cost, non-complicated material advancing apparatus which may be reliably used in lieu of bar feeders of the type known in the art having ample storage capacities and automated features.

It is another object of the present invention to provide such a material advancing apparatus which minimizes operator involvement to the extent of automated bar feeders, but affords flexibility to the operator in machining small, intricate parts and the like at a reasonable rate of production and of acceptable quality.

It is yet another object of the present invention to provide such a material advancing apparatus which comprises means for attaching to numerous types of headstock spindle assemblies and the like with undue retrofit and modification of new and existing turning and milling machines.

It is yet another object of the present invention to provide such a material advancing apparatus which is operable by mechanical means and functionally controlled by the operating parameters set for the headstock spindle assembly, as compared to external pneumatics or hydraulic means often associated with operable prior art devices.

It is another object of the present invention to provide such a material advancing apparatus which possesses a minimal number of operating components to ensure sustained, reliable operation of the turning and milling machine.

It is yet another object of the present invention to provide such a material advancing apparatus which is operable regardless of the presence of a computer numeric controller for turning and milling machining operations.

It is yet another object of the present invention to provide such a material advancing apparatus which accommodates a variety of material stock shapes and sizes to afford versatility and flexibility to the operator in machining parts and the like having unique geometric profiles.

It is yet another object of the present invention to provide such a material advancing apparatus which can be accommodated within the spatial requirements or foot print of the turning and milling machine, thus affording the production shop added space for increased productive capacities.

It is yet another object of the present invention to provide such a material advancing apparatus which is readily accessible for purposes of setup and adjustment and maintenance and repair without sustaining substantial operating downtimes.

It is yet another object of the present invention to provide such a material advancing apparatus which accomplishes the foregoing and other objects and advantages and which is economical, durable, and fully effective in performing its intended functions.

In accordance with the present invention, a material advancing apparatus has been devised for use with a turning and milling machine having a computerized numeric controller or lacking programmable capacity, the apparatus comprising in combination an elongate body of cylindrical form having first and second ends and an interior chamber for housing therein a plunger assembly operably working therewithin and along the longitudinal axis of the elongate body, the second end comprising means for attaching the elongate body to a collet or chuck adapter often used in association with a headstock spindle assembly; an end plug having a threaded section situated in between external and internal ends thereof, with the threaded section being threadably attached to the first end to permit the internal end to substantially engage a portion of the plunger assembly and ensure proper axially positioning of the plunger assembly during cyclic operation, the plunger assembly comprising a ram operably acting longitudinally within the interior chamber of the elongate body via biasing means comprising at least one spring operably acting in conjunction with controller means used in opening and closing the collet or chuck adapter, which collectively controls the advancement of material stock toward and beyond the second end to permit the machining thereof for conversion into a useful product.

Other objects, features, and advantages of the present invention will become apparent in the following detailed description of the preferred embodiments thereof when read in conjunction with the accompanying drawings in which like reference numerals depict the same parts in the various views.

BRIEF DESCRIPTION OF THE SEVERAL VIEWS OF THE DRAWINGS

A preferred embodiment of the present invention will now be described by way of example with reference to the accompanying drawings, in which:

FIG. 2 is a side elevational view of the preferred embodiment of the present invention illustrating an end plug having a threaded section situated in between external and internal ends thereof;

FIG. 3 is a side cross sectional view of the preferred embodiment of the present invention taken on line 3—3 of FIG. 4 illustrating an end plug having a venting bore extending lengthwise thereabout;

FIG. 4 is an end view of the preferred embodiment of the present invention illustrating an end plug having an external end;

FIG. 5 is a side perspective view of the preferred embodiment of the present invention illustrating an elongate body having an end plug attached thereto and a pair of flattened sections existing on the outer surface thereof;

FIG. 6 is a front end view of the preferred embodiment of the present invention illustrating placement of a retaining ring at a second end of an elongate body;

FIG. 11 is a side elevational view of the preferred embodiment of the present invention illustrating a ram made part of a plunger assembly;

FIG. 12 is a back end view of the preferred embodiment of the present invention illustrating a ram having a spring retainer integrally connected to a cylindrical stop;

FIG. 13 is a front end view of the preferred embodiment of the present invention illustrating a ram having a shaft fitted with an inwardly conical depression at its end;

FIG. 15 is a side elevational view of the preferred embodiment of the present invention illustrating an intermediate spring guide;

FIG. 16 is a front end view of the preferred embodiment of the present invention illustrating an intermediate spring guide having an annular spring seat and an elongate aperture extending longitudinally therethrough;

FIG. 17 is a side cross sectional view of the preferred embodiment of the present invention taken on line 17—17 of FIG. 16 illustrating an intermediate spring guide having an elongate aperture extending therethrough and a pair of annular spring seats integrally made part thereof;

DETAILED DESCRIPTION OF THE PREFERRED EMBODIMENT

While this invention is susceptible of being embodied in many different forms, the preferred embodiment of the invention is illustrated in the accompanying drawings and described in detail hereinafter with the understanding that the present disclosure is to be considered to exemplify the principles of the present invention and is not intended to limit the invention to the embodiments illustrated and presented herein. The present invention has particular utility as an apparatus for advancing material stock into and through a headstock spindle assembly of a turning and milling machine having a computerized numeric controller or lacking programmable capacity, either means of which being available to permit machining of the material stock into a useful product.

Figure 1:
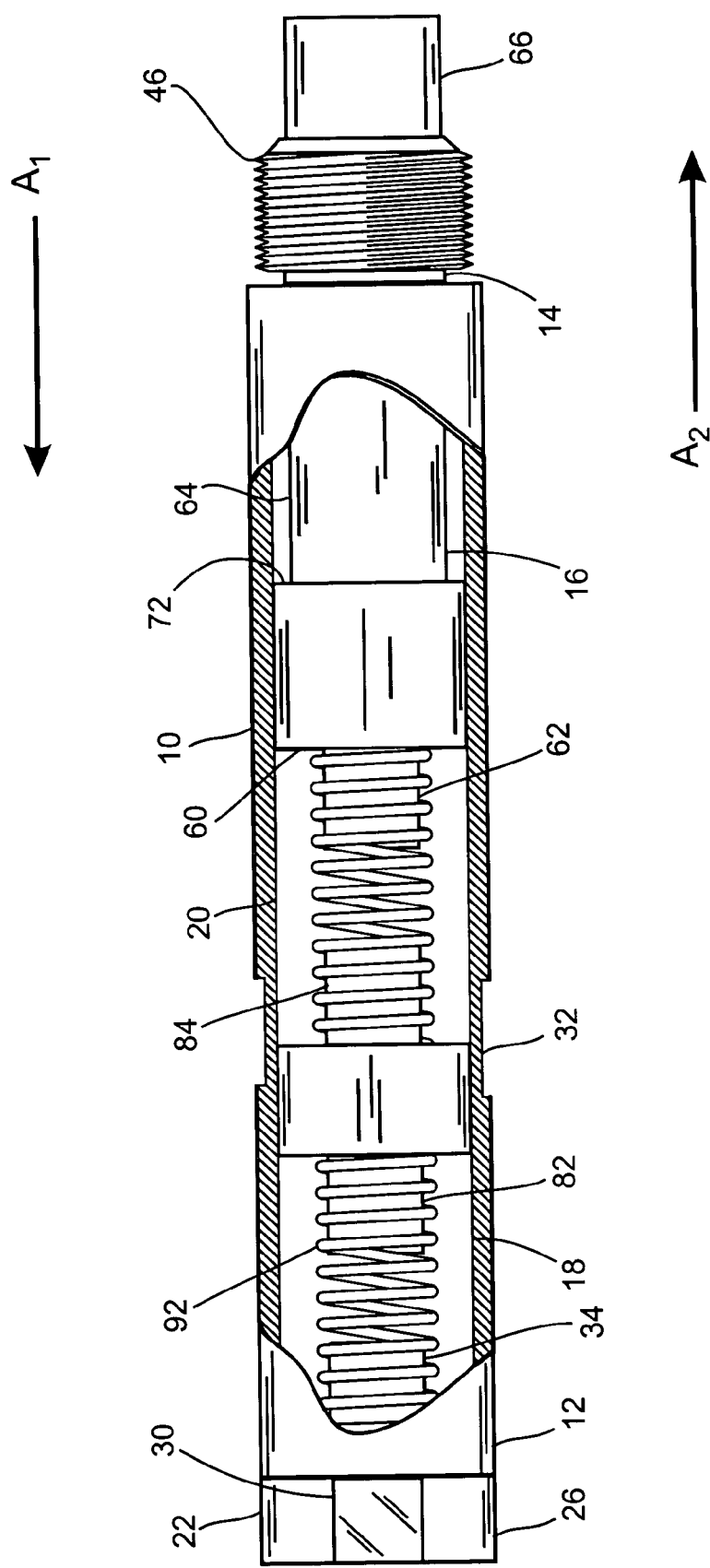
FIG. 1 is a partial cross sectional view of the preferred embodiment of the present invention illustrating a plunger assembly housed within an interior chamber and operably acting longitudinally therewithin.

Referring now to FIG. 1, there is shown generally at 10 an elongate body of cylindrical form having first and second ends 12, 14 and a plunger assembly 16 operatively working within and along the longitudinal axis of the elongate body. In the referred embodiment, the elongate body comprises a cylindrical bore 18 extending lengthwise thereabout defining an interior chamber 20 to house a substantial portion of the plunger assembly. An end plug 22 selectively attached to the first end 12 suitably serves in establishing the proper axial position of the plunger assembly 16 as it repeatedly moves toward and away from the first and second ends.

The end plug preferably comprises a threaded section 24 situated in between external and internal ends 26, 28 thereof, as best illustrated in FIG. 2. The external end, which substantially conforms to the exterior cylindrical surface of the elongate body, most notably apparent after assembly as shown in FIG. 1, serves as means for grasping and handling the end plug 22 to enable inward positioning of the internal end 28 within the cylindrical bore to further engage a portion of the plunger assembly 16. In similar operable respects, the external end 26 facilitates removal of the end plug from the elongate body 10 to expose the plunger assembly for maintenance and repair purposes. To readily accomplish the foregoing, the cylindrical bore, notably at the first end 12 of the elongate body, is fitted with threads suitable in size to accept the threaded section 24 of the end plug, as shown in FIGS. 2 and 3. Although hand tightening of the end plug may suffice in certain applications, it is preferred that the end plug is tightened to a tolerable torque to prevent inadvertent movement and release from the elongate body during machining operations. Accordingly, the end plug comprises a first pair of flattened sections 30 extending parallel to one another and being diametrically positioned about the outer circumferential surface of the external end 26 to form an end profile to the likes shown in FIG. 4. Similarly, as shown in FIG. 5, the elongate body comprises a second pair of flattened sections 32 extending parallel to one another and being diametrically positioned about the outer circumferential surface of the elongate body 10, specifically being configured to cooperate with those of the end plug 22 during moments of tightening and loosening. A pair of open-ended box wrenches or equivalent means simultaneously fitted onto the opposing positioned flattened sections of the end plug and elongate body and operably working against one another permits selective directional turning of the end plug 22 about the elongate body 10.

As depicted in FIGS. 2 and 3, the internal end 28 comprises a neck 34 having a geometric form of a cylinder extending outwardly a predetermined distance from the threaded section 24 of the end plug. In preferred applications, the internal end comprises a diameter smaller than the external end insofar to allow the neck to selectively cooperate and slidingly fit within the geometric arrangement of the plunger assembly 16 and extends inwardly within the interior chamber a predetermined distance to stabilize and ensure axial alignment of the plunger assembly during operable cyclic states noticeably occurring within the elongate body 10, as particularly illustrated in FIG. 1. Since a minimal amount of pressure may build up during the compression cycle, particularly during the moment that the plunger assembly is slidably moved toward the first end 12 of the elongate body, the end plug 22 is suitably equipped with a venting bore 36 extending longitudinally thereabout, as best illustrated in FIG. 3. Similarly, the venting bore may further serve in relieving negative pressure build up while the plunger assembly moves longitudinally toward the second end 14 of the elongate body. In addition to its primary purpose, the venting bore may serve as means for gaining access to the plunger assembly while operably housed within the elongate body. For instance, during cyclic motion, the plunger assembly 16 may inadvertently rack or jamb to the extent of establishing unreliable performance. In such event, an elongate tool of some sort or stiff wire may be inserted into and through the venting bore to engage or contact a portion of the plunger assembly to free it from its undesirable position without having to threadingly release and remove the end plug 22 from the elongate body. Because there may be tendencies for the end plug to vibrate loose from the elongate body while in an operable state, notwithstanding the use of a wrench to achieve a predetermined torque, the threaded section of the end plug may be coated with Loctite® or an equivalent substance which maintains the end plug's tightened position while affording subsequent opportunity for removal by a wrench made suitable for the task.

Figure 7:
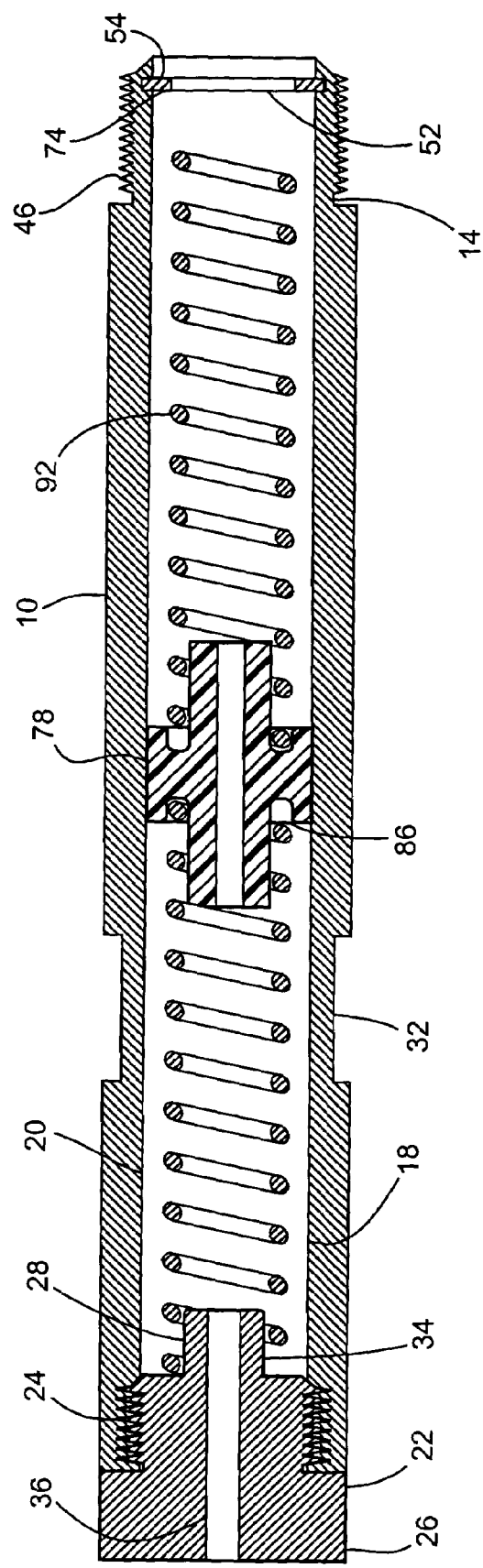
FIG. 7 is a side cross sectional view of the preferred embodiment of the present invention taken on line 7—7 of FIG. 6 illustrating placement of a plunger assembly within an interior chamber of an elongate body.
Figure 8:
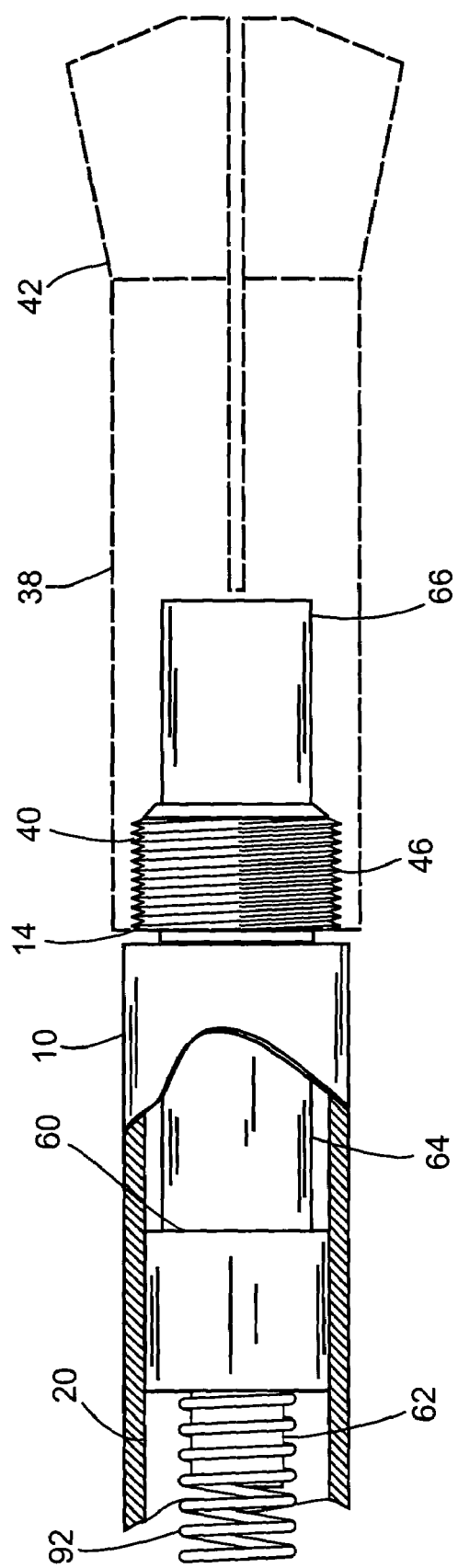
FIG. 8 is a partial sectional view of the preferred embodiment of the present invention illustrating a collet threadably attached to a second end of an elongate body.
Figure 9:
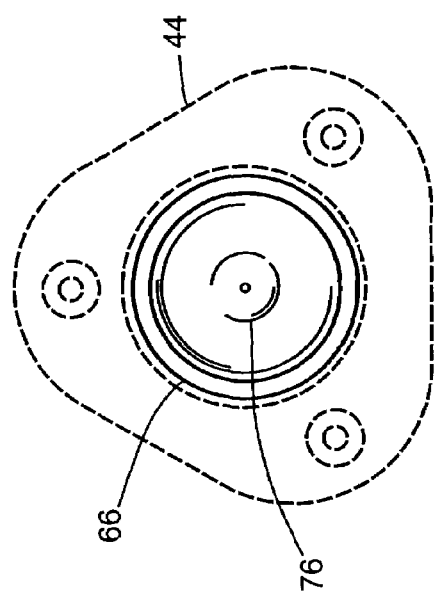
FIG. 9 is a front end view of the preferred embodiment of the present invention illustrating a shaft positioned within a chuck adapter used in association with a headstock spindle assembly.
Figure 10:
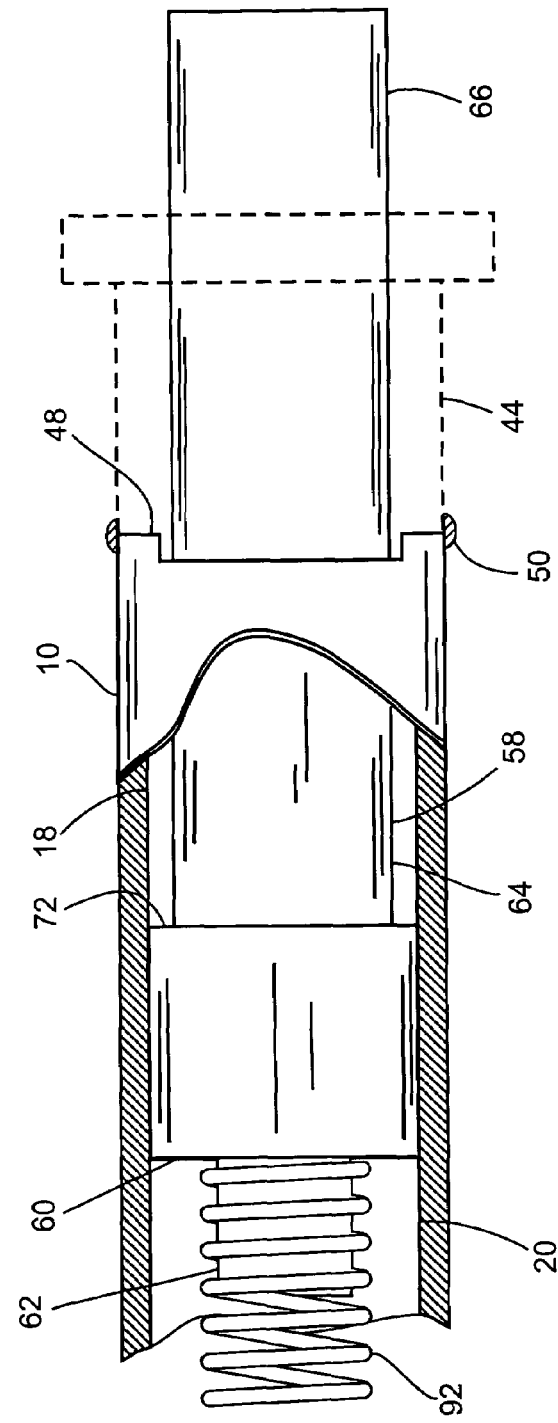
FIG. 10 is a partial sectional view of the preferred embodiment of the present invention illustrating a chuck adapter attached to a second end of an elongate body.

Referring now to FIGS. 5 and 7, the second end 14 of the elongate body comprises means for attaching the elongate body to external holding devices often used in association with the headstock spindle assembly. The most common external holding device in use today, particularly those cooperating with a turning and milling machine having a computer numeric controller, comprises a collet 38 having a threaded end section 40 and an outwardly tapered end 42 opposite thereof forming an overall body to conform and fit within the geometric arrangement of the clamping or chucking mechanism made part of the headstock spindle assembly, as shown in FIG. 8. Other prior art devices in association with the headstock spindle assembly, as illustrated in FIGS. 9 and 10, may comprise simply of a chuck adapter 44 that is geometrically configured to fit and cooperate with the clamping or chucking mechanism similarly employed for use with the collet. As shown in FIG. 8, attaching means preferably comprises a threaded section 46 having a thread arrangement (i.e., size and spacing) substantially equivalent to the internal threads 40 made part of the collet. Like the end plug 22, the threaded section 24 of the elongate body is tightened to a predetermined torque to the collet using a wrench or equivalent means. Other attaching means may be appropriately used in this application, namely one which provides for more permanency of the connection between the elongate body and collet 38 or chuck adapter 44. For instance, the second end 14 of the elongate body, as shown in FIG. 10, may comprise a keyed portion 48 which geometrically conforms to an equivalent structure of the collet or chuck adapter to mate accordingly therewith of which is permanently fastened by a bead of weld 50 or equivalent. In either form of attaching means, as noted above, the second end of the elongate body 10 further comprises means for retaining the plunger assembly while being operably housed within the interior chamber 20. Retaining means principally serves in restricting the extent to which the plunger assembly 16 moves toward and beyond the second end of the elongate body during operable cyclic conditions. In the preferred embodiment, retaining means comprises a retention slot 52 for holding and supporting therein a retaining ring 54 of the type having an open-ended portion 56 along its circumference, substantially in the form shown in FIGS. 6 and 7. Through this configuration, the retaining ring is permitted to collapse radially inward to the extent that its effective outer diameter is reduced and accommodated within the internal diameter of the elongate body, notably at the second end 14 thereof. After further moving the collapsed retaining ring toward the retention slot 52 for final positioning thereat, the retaining ring 54 is selectively released to permit expansion thereof, subsequently forming a smaller effective diameter at the second end to retain biasing means within the interior chamber while affording intermittent passage of a portion of the plunger assembly 16 through the second end during cyclic operation.

Figure 14:
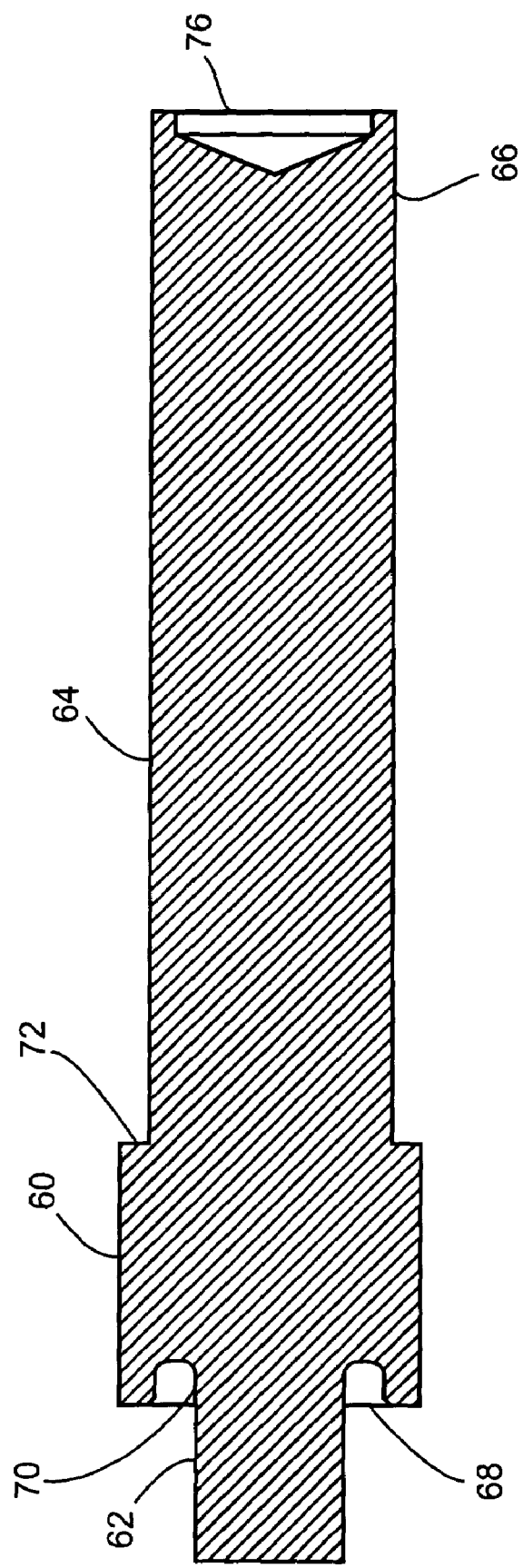
FIG. 14 is a side cross sectional view of the preferred embodiment of the present invention taken on line 14—14 of FIGS. 12 and 13 illustrating a ram having an annular spring seat and an inwardly conical depression.

As illustrated in FIGS. 1 and 11, the plunger assembly comprises a ram 58 operably acting longitudinally within the interior chamber 20 of the elongate body via biasing means. The ram of integral construction comprises a cylindrical stop 60 situated in between a spring retainer 62 and a shaft 64 having an end 66 in engagement with material stock, collectively as shown in FIG. 11. The cylindrical stop, as shown in FIG. 12, comprises an annular spring seat 68 having an inner wall 70 in common with the outside diameter of the spring retainer having a geometric configuration of a cylinder. The spring retainer and annular spring seat, like the internal end of the end plug shown in FIGS. 2 through 4, collectively function to cooperate with biasing means to ensure proper positioning thereof as it expands and contracts within the interior chamber 20 during cyclic operation. In order to limit the extent to which the plunger assembly 16 moves within the interior chamber and beyond the second end 14 of the elongate body, the cylindrical stop 60, as shown in FIGS. 11 through 13, comprises an outer facing wall 72 formed by the diametric difference of the cylindrical stop and shaft 64, which substantially contacts an inner surface portion 74 of the retaining ring as the plunger assembly advances forward in the direction of the second end. Preferably, the outer facing wall 72 comprises a surface area substantially equivalent to the inner surface portion 74 of the retaining ring to maximize surface contact for assured stopping of the plunger assembly. To ensure stability and proper axial positioning of the material stock relative to the shaft 64, the end of the shaft comprises an inwardly conical depression 76 for accepting therein an end of the material stock, as best illustrated in FIGS. 13 and 14.

In some applications requiring accommodation of material stock having a longer linear dimension, thus necessitating an elongate body 10 of longer dimensions, the plunger assembly 16 may comprise one or more intermediate spring guides 78 for stabilizing and properly orientating biasing means while operating within the interior chamber 20, as best illustrated in FIGS. 1 and 7. Similar to the ram 58 in terms of structure and operable features, each intermediate guide of integral construction, as shown in FIGS. 15 through 17, comprises a cylindrical midsection 80 situated in between first and second retaining ends 82, 84, which collectively cooperate with the ends of biasing means. As illustrated in FIG. 1, the cylindrical midsection 80 comprises a predetermined diameter which promotes plunger assembly 16 movement and retains effective axial positioning of the plunger assembly. The cylindrical midsection, like the cylindrical stop of the ram, comprises a pair of annular spring seats 86 each having an innermost wall 88 in common with the outer diameter of the first and second retaining ends, substantially as shown in FIGS. 15 and 17. In order to prevent racking of the intermediate spring guide 78 and mitigate the occurrence of biasing means coming into contact with the elongate body's inner wall during cyclic operation, the first and second retaining ends 82, 84 each comprise a length substantially two times the length of the cylindrical midsection. In application of their use, each intermediate spring guide 78 is fabricated from a light-weighted material to ensure unhindered movement within the interior chamber 20 and cooperation with the contracting and expanding movement of biasing means. Typical materials most suitable for this application may comprise of ultra high molecular weight (UHMW) polyethylene, Teflon®, polycarbonate, as well as other polymeric-based materials possessing reasonable wear and lubricity characteristics. Like the end plug 22, each intermediate spring guide, as depicted in FIG. 17, comprises an elongate aperture 90 extending lengthwise thereabout to serve in venting or releasing pressure buildup as the intermediate guide 78 sustains cyclic movement within the interior chamber, particularly since the diameter of the cylindrical midsection 80 is slightly less than the effective inner diameter of the elongate body.

As shown in FIGS. 1 and 7, biasing means preferably comprises at least one spring 92 having a length substantially equivalent to the length of the elongate body 10 less the linear dimension from the second end 14 to the retaining slot and the linear dimension from the first end 12 to the inward end of the threaded section of the end plug, adjacent to the neck. In multiple spring arrangements, the number of intermediate guides 78 placed within the interior chamber 20 would multiple accordingly. For instance, a two spring application, as shown in FIG. 1, would require usage of one intermediate spring guide, while a three spring application would require usage of two intermediate spring guides, and so forth. In all multiple spring arrangements, the length of each spring 92 is determined by the effective length of each intermediate spring guide and the lineal measurements noted above for applications involving one spring. In the preferred embodiment, the spring should possess sufficient resiliency to permit the material stock partially housed within the interior chamber 20 to advance forward toward and beyond the second end 14 as the accompanying collet cycles from a closed state to one that is open. However, the spring should not be sufficiently rigid or stiff insofar that it is made difficult to compress the plunger assembly 16 with material stock or inadvertently acts in advancing the material stock beyond the collet in a closed, operable state given its high compression load. Regardless of the spring configuration, the spring 92 preferably comprises an effective diameter to operably cooperate with the components of the plunger assembly and stationary positioning of the end plug, namely the spring retainer 62 of the ram, internal end 28 of the end plug, and first and second retaining ends of the intermediate spring guide.

In operation, the second end 14 of the elongate body is initially fastened by attaching means to either a collet or a chuck adapter 44 made part of the headstock spindle assembly. The collet 38 fixedly attached to the elongate body is suitably positioned within and held in place by the chucking mechanism of the headstock spindle assembly, generally being activated by the computer numeric controller or by manual means. Material stock of suitable dimension is placed within the area of headstock spindle assembly, with the end of the material stock being advanced toward the conical depression 76 of the shaft until it substantially engages therewith. With the collet in an open position, the material stock is advanced axially or pushed inwardly in the direction of $A_1$ in FIG. 1, specifically within the interior chamber 20 insofar to compress a portion of the plunger assembly 16 up against the end plug 22. The controller is then activated to act on the chucking mechanism and close the collet 38 about the material stock and reactivated to open the collet to advance the material stock therethrough by biasing means made part of the plunger assembly and continues moving forward in the direction of $A_2$ in FIG. 1 until it engages a stop made part of the turning and milling machine.

Figure 18:
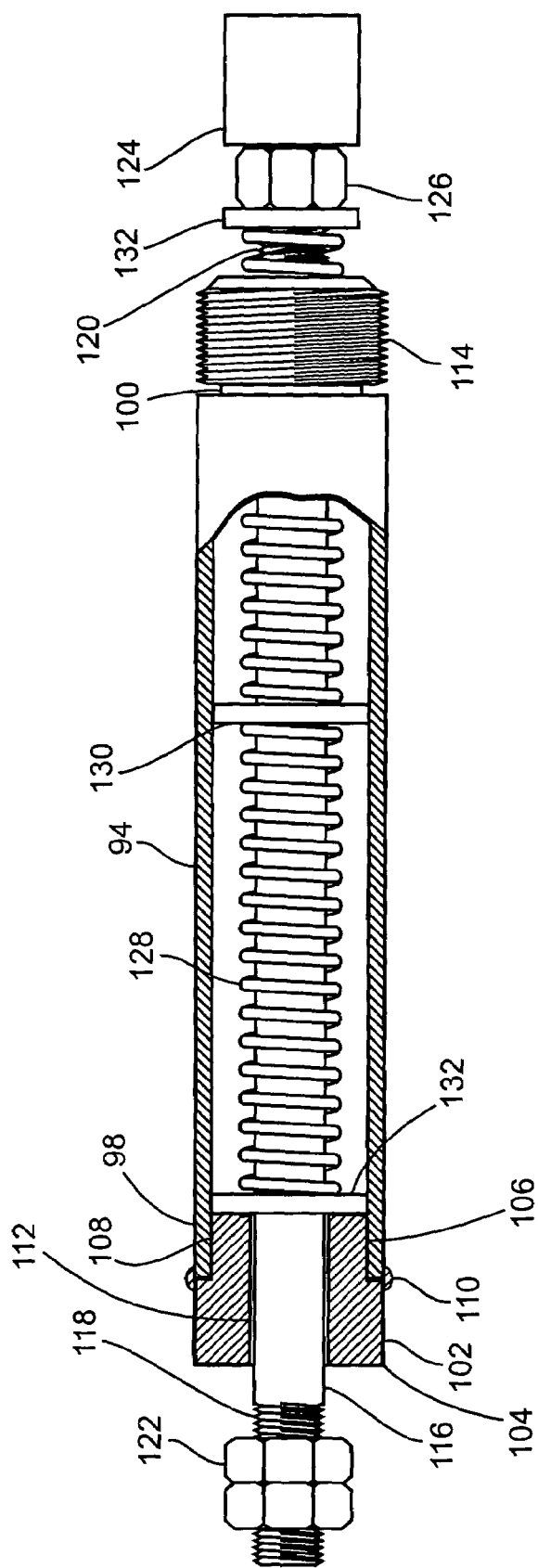
FIG. 18 is a partial cross sectional view of an alternative embodiment of the present invention illustrating a drive assembly positioned within a tubular housing.

As shown in FIG. 18, an alternative embodiment of the present invention comprises a tubular housing 94 for storing therein a drive assembly 96 having means for advancing material stock through the headstock spindle assembly. The tubular housing preferably comprises distal and proximal ends 98, 100 each providing for partial passage of the drive assembly. Fixedly attached to the distal end, as depicted in FIG. 18, is an end cap 102 having outer and inner members 104, 106 each of cylindrical form to conform in general to the cylindrical shape of the tubular housing. The outer member preferably comprises an outside diameter substantially equivalent to the outer diameter of the tubular housing, while the inner member 106 comprises an outside diameter substantially equivalent to the inner diameter thereof, resulting in an arrangement which permits the end cap 102 to slidably fit within an accessible opening 108 located at the distal end. Fixedly attaching the end cap to the tubular housing is preferably achieved by a bead of weld 110 situated along the seam formed by the placement of the end cap to the accessible opening of the distal end, substantially in the manner shown in FIG. 18. The end cap further comprises an elongate bore 112 extending centrally and longitudinally thereof to permit partial passage and extension of the drive assembly 96 beyond the distal end. The proximal end of the tubular housing 94 comprises means for connecting the tubular housing to external devices such as a collet 38 or chuck adapter 44 of the type known in the art and as previously discussed for use with the preferred embodiment of the present invention. In application of their use, connecting means preferably comprises a threaded portion 114 to threadably accept an end of the collet or chuck adapter having a similar thread arrangement. Other connecting means noted herein may comprise of a keyed end portion to the likes described for the preferred embodiment of the present invention, with permanency of the connection being established by a bead of weld situated along of the seam form by the placement of the collet or chuck adapter to the proximal end.

Figure 19:
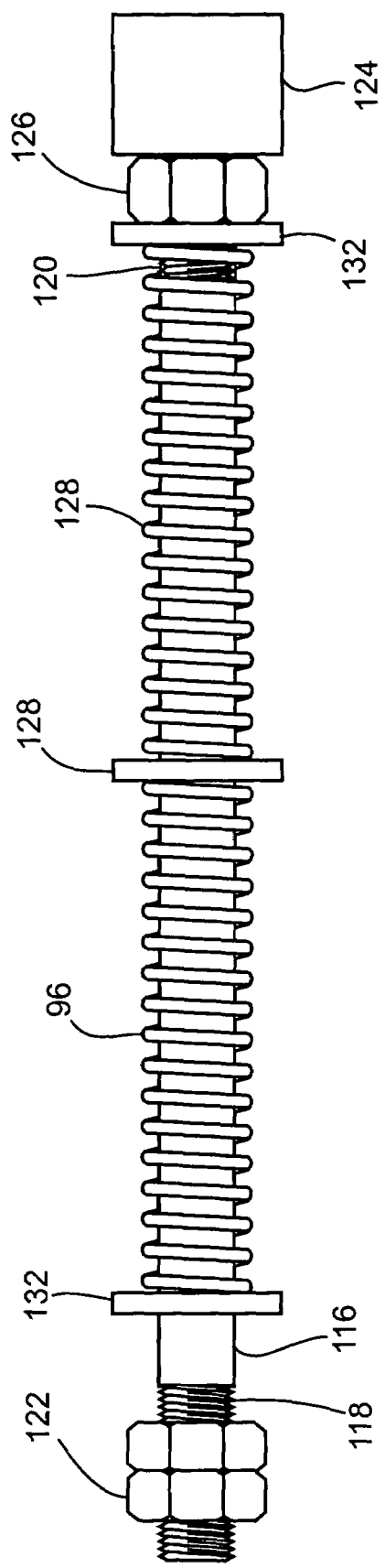
FIG. 19 is a side elevational view of the alternative embodiment of the present invention illustrating a drive assembly having a pair of springs situated in between a material pusher threadably attached to a second threaded end thereof and a pair of locking nuts threadably attached to a first threaded end thereof.
Figure 20:
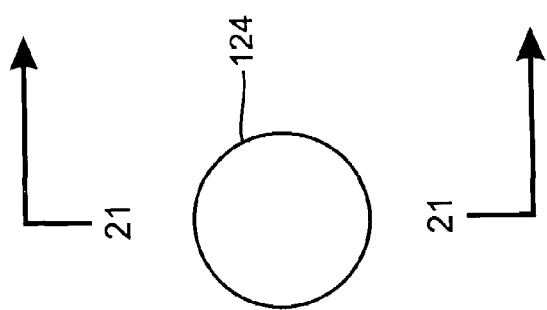
FIG. 20 is a front end view of the alternative embodiment of the present invention illustrating a material pusher attached to a drive assembly.
Figure 21:
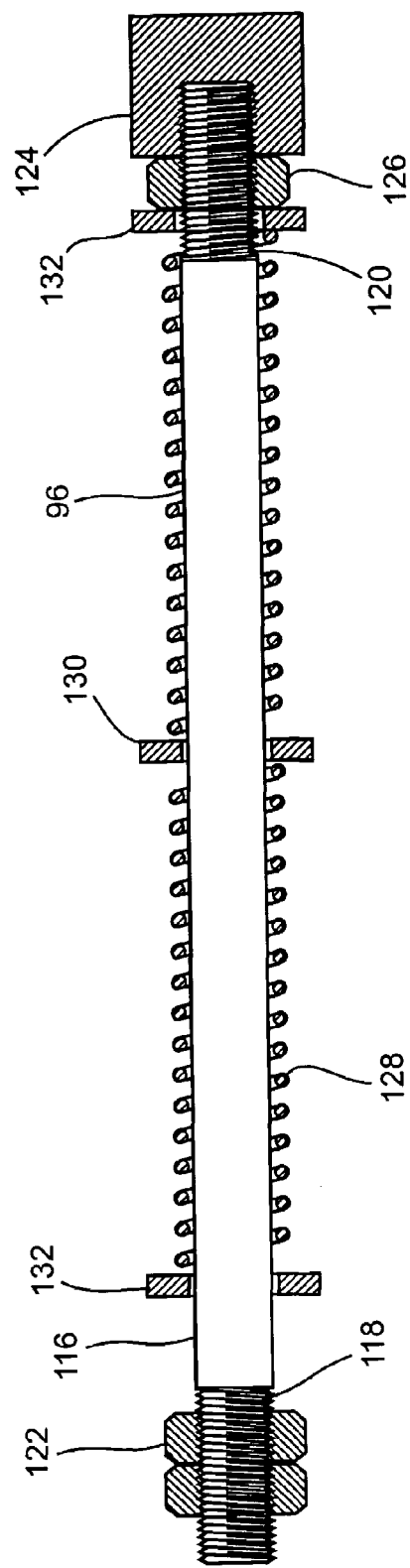
FIG. 21 is a side cross sectional view of the alternative embodiment of the present invention taken on line 21—21 of FIG. 20 illustrating a drive assembly having a pair of springs situated in between a material pusher threadably attached to a second threaded end thereof and a pair of locking nuts threadably attached to a first threaded end thereof.

Referring now to FIG. 19, the drive assembly 96 comprises an elongate rod 116 having a predetermined length and first and second threaded ends 118, 120. As shown in FIG. 18, the first threaded end 118 of the rod extends outwardly beyond the distal end 98 to accept a pair of locking nuts 122 each having an equivalent thread arrangement. The locking nuts principally serve in retaining a portion of the rod beyond the distal end and limit the extent to which the drive assembly 96 can move forward toward the proximal end 100 by advancing means. Tensioning of advancing means is equally established by tightening or advancing the locking nuts in the direction of the proximal end. Threadably mounted to the second threaded end 120 of the rod is a material pusher 124 which engages the material stock during operable cyclic events. The material pusher, as illustrated in FIGS. 20 and 21, comprises a cylindrical shape and a diameter slightly less than the effective inner diameter of the tubular housing to permit partial longitudinal travel therewithin during the compression cycle of advancing means. To ensure a tightened state of the material pusher 124 during operation, a locking nut 126 is threadably attached to the second threaded end of the rod.

Advancing means, as shown in FIGS. 18 and 21, comprises at least one spring 128 having an effective length substantially equivalent to the length of the tubular housing less the inward lineal dimension of the inner member 106 of the end cap 102. The spring preferably comprises an inner diameter slightly larger than the diameter of the rod to promote passage of the rod 116 within the geometric confines of the spring and yet sustain lateral movement of the rod within the tubular housing without undue binding. Like the preferred embodiment of the present invention, multiple spring arrangements can be used in accommodating the length of the tubular housing 94 and ensure sufficient lateral movement of the drive assembly for reliable advancement of the material stock in and through the headstock spindle assembly.

In multiple spring arrangements, each spring 128 is separated in part by a washer 130 of the type shown in FIGS. 19 and 21. The washers, like the intermediate guides, ensure stability and proper orientation of the spring during compressive and expansive cycles of the drive assembly 96. Regardless of the number of springs used in this alternative application, the first and second threaded ends 118, 120 of the rod each receive an end positioned washer 132 to serve as base for each end of the spring to mitigate twisting of the spring during cyclic motion of the drive assembly. The end positioned washer located at the first threaded end 118 is preferably positioned near the distal end 98, which suitably rests up against the inner member 106 of the end cap, while the end positioned washer located near the proximal end 100 is situated near the locking nut used in securing the material pusher, collectively as shown in FIG. 19. All washers used in the alternative embodiment preferably comprise an outer diameter slightly less than the effective inner diameter of the tubular housing to permit lateral travel and limit any occurrence of racking or binding during cyclic motion of the drive assembly 96.

Figure 22:
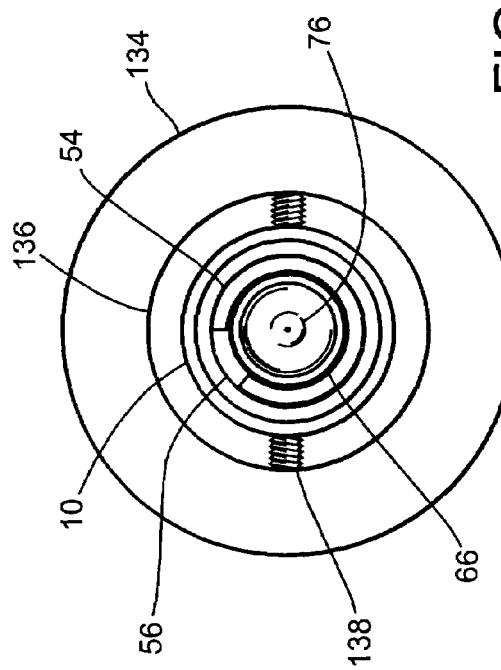
FIG. 22 is a front end view of the preferred embodiment of the present invention illustrating a stabilizer sleeve mounted to an elongate body.
Figure 23:
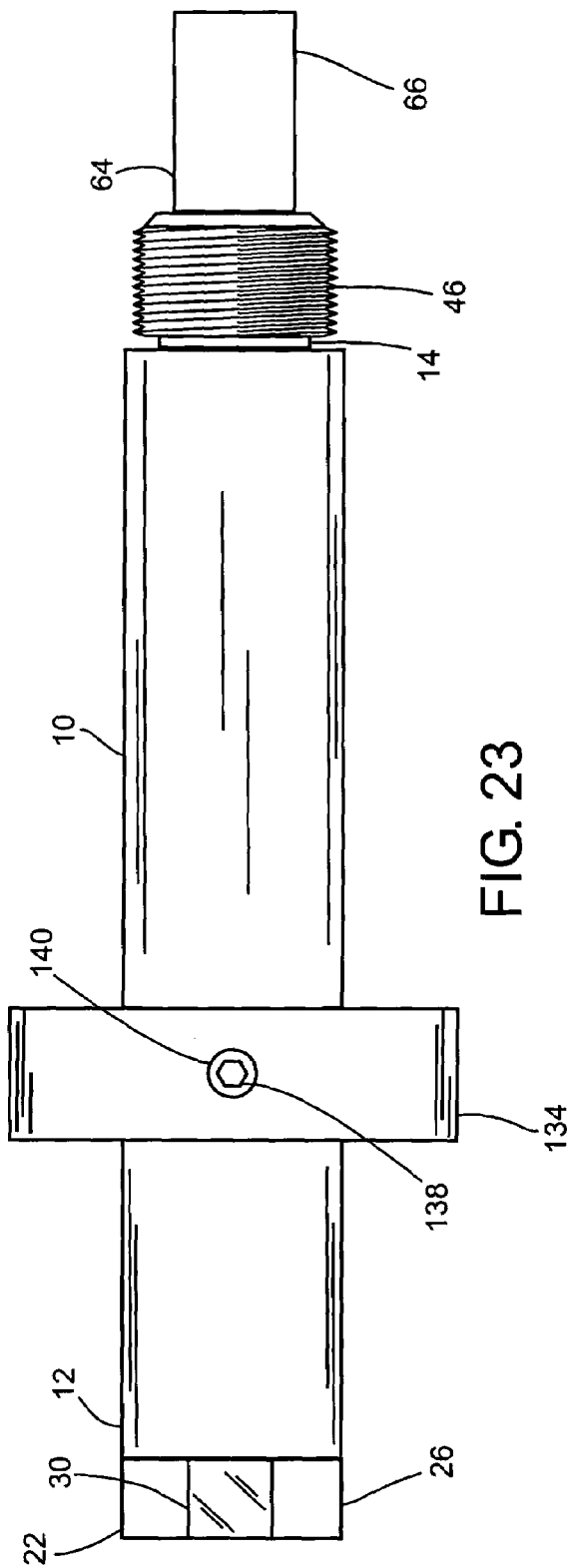
FIG. 23 is a side elevational view of the preferred embodiment of the present invention illustrating a stabilizer sleeve mounted to an elongate body.

Although the present invention suitably operates as a standalone device in most applications, there may be instances where the elongate body 10 or tubular housing 94 vibrates at a high spindle speed, particularly where the elongate body or tubular housing comprises a substantial length necessitating the use of multiple springs. In this instance, a stabilizer sleeve 134 having an inner opening 136 centrally located thereabout is slidably fitted over and positioned onto the elongate body or tubular housing and tightened in place using a pair of set screws 138 threadably attached to the stabilizer sleeve 134 and extending radially inward toward the elongate body or tubular housing, collectively as shown in FIG. 22. Preferably, each set screws is positioned in a recessed cavity 140 to permit the elongate body or tubular housing adaptably fitted with the stabilizer sleeve to be accommodate within the inner geometric limitations of the headstock spindle assembly. In most applications, as shown in FIG. 23, the stabilizer sleeve is preferably fitted onto the elongate body 10 or tubular housing 94 approximately one-third distance from the end plug 22 or end cap 102, respectfully, which at this location sufficiently dampens most vibration noticeably apparent at a high spindle speed.

It can be seen from the foregoing that there is provided in accordance with this invention a simple and easily operated device, which is particularly suitable for operation with a turning and milling machine of the type commonly known and used in the art to form useful products from material stock. The material advancing apparatus is completely functional in a variety of turning and milling machines with or without programmable capabilities and having a headstock spindle assembly. It is obvious that the components comprising the material advancing apparatus may be fabricated from a variety of materials, providing such selection or use of materials possess the capacity to withstand forces acting thereon throughout its duration of use in a machine shop setting. Accordingly, it is most desirable, and therefore preferred, to construct the elongate body 10 and end plug 22 from carbon steel plated or coated with black zinc, intermediate spring guides 78 from UHMW polyethylene or equivalent, and the ram from light-weighted aluminum or an equivalent material. Similarly, the tubular housing, end cap and drive assembly of the alternative embodiment are fabricated from carbon steel. In all applications, the stabilizer sleeve 134 is fabricated from a light-weighted alloy such as aluminum and an equivalent material.

While there has been shown and described a particular embodiment of the invention, it will be obvious to those skilled in the art that various changes and alterations can be made therein without departing from the invention and, therefore, it is aimed in the appended claims to cover all such changes and alterations which fall within the true spirit and scope of the invention.

What is claimed is:

1. An apparatus for advancing material stock into and through an external holding device seated in a headstock spindle assembly, said apparatus comprising in combination:

an elongate body having first and second ends and a cylindrical bore extending lengthwise thereabout defining an interior chamber;

a plunger assembly housed within said interior chamber and operably working longitudinally therewithin, said plunger assembly comprising means for biasing a ram having a cylindrical stop situated in between a spring retainer and a shaft having an inwardly conical depression at its end to engage an end of material stock, said cylindrical stop comprising an annular spring seat having an inner wall in common with the outside diameter of said spring retainer;

an end plug fixedly attached to said first end to retain axial positioning of said plunger assembly within said interior chamber while operably moving toward and away from said first and second ends; and means for attaching said second end of elongate body to the external holding device.

2. An apparatus as set forth in claim 1, wherein said end plug further comprises a threaded section situated in between external and internal ends thereof, said threaded section being threadably attached to a threaded portion of said first end to permit said internal end to reside within said interior chamber.

3. An apparatus as set forth in claim 2, wherein said external end comprises a geometric configuration substantially conforming to the geometric shape of said elongate body to serve as means for grasping and handling said end plug and gain access to said interior chamber for purposes of maintenance and repair.

4. An apparatus as set forth in claim 2, wherein said internal end comprises a neck having a smaller diameter than said external end and said threaded section and extending inwardly within said interior chamber a predetermined distance to engage and stabilize said plunger assembly during cyclic operation.

5. An apparatus as set forth in claim 1, wherein said end plug further comprises a venting bore extending lengthwise thereabout to serve in equalizing pressure while said plunger assembly operably moves longitudinally within said interior chamber.

6. An apparatus as set forth in claim 1, wherein said attaching means comprises a threaded section having a thread arrangement substantially equivalent to a threaded end section of the external holding device.

7. An apparatus as set forth in claim 1, wherein said attaching means comprises a keyed portion at said second end adaptably fitted to an equivalent structure made part of the external holding device, permanently being fastened to one another by a bead of weld.

8. An apparatus as set forth in claim 1, wherein said cylindrical stop further comprises an outer facing wall substantially formed by the diametric difference of said cylindrical stop and said shaft, said second end comprising a retention slot for housing therein a retaining clip having an inner surface portion momentarily engaging said outer facing wall as said plunger assembly cyclically travels within said interior chamber toward said second end of elongate body.

9. An apparatus as set forth in claim 1, wherein said biasing means comprises a spring having one end slidably positioned onto said spring retainer and seated into said annular spring seat and a second end mounted to said end plug.

10. An apparatus as set forth in claim 1, wherein said biasing means comprises more than one spring situated in between one less in number of intermediate spring guides each having a cylindrical midsection situated in between first and second retaining ends, said cylindrical midsection comprising a pair of annular spring seats each having an innermost wall in common with the outer diameter of said first and second retaining ends.

11. An apparatus as set forth in claim 10, wherein said end plug and said elongate body are fabricated from carbon steel substantially coated with black zinc and said intermediate spring guide is fabricated from a light-weighted polymeric material.

12. An apparatus as set forth in claim 1, wherein said end plug and said elongate body each comprise a pair flattened sections diametrically positioned to assist in turning said end plug about said elongate body.

13. An apparatus as set forth in claim 1, further comprising a stabilizer sleeve having an inner opening centrally located thereabout to slidably fit over and onto said elongate body and a pair of recessed cavities each receiving therein a set screw threadably extending inward to tighten said stabilizer sleeve to said elongate body which collectively mitigates the occurrence of vibration while being accommodated within the headstock spindle assembly.

14. An apparatus for advancing material stock into and through an external holding device seated in a headstock spindle assembly, said apparatus comprising in combination:

an elongate body having first and second ends and a cylindrical bore extending lengthwise thereabout defining an interior chamber, said second end comprising a threaded section having a thread arrangement substantially equivalent to a threaded end section of the external holding device;

a plunger assembly housed within said interior chamber and operably working longitudinally therewithin, said plunger assembly comprising means for biasing a ram having a cylindrical stop situated in between a spring retainer and a shaft having an inwardly conical depression at its end in engagement with material stock, said cylindrical stop comprising an annular spring seat having an inner wall in common with the outside diameter of said spring retainer, said cylindrical stop comprising an outer facing wall substantially formed by the diametric difference of said cylindrical stop and said shaft, said second end comprising a retention slot for housing therein a retaining clip having an inner surface portion momentarily engaging said outer facing wall as said plunger assembly cyclically travels within said interior chamber toward said second end of elongate body; and an end plug fixedly attached to said first end to retain axial positioning of said plunger within said interior chamber while operably moving toward and away from said first and second ends, said end plug comprising a threaded section situated in between external and internal ends thereof and a venting bore extending lengthwise thereabout to serve in equalizing pressure while said plunger assembly operably moves longitudinally within said interior chamber, said threaded section being threadably attached to a threaded portion of said first end to permit said internal end to reside within said interior chamber.

15. An apparatus as set forth in claim 14, wherein said biasing means comprises a spring having one end slidably positioned onto said spring retainer and seated into said annular spring seat of said cylindrical stop and a second end engaged to said end plug.

16. An apparatus as set forth in claim 14, wherein said biasing means comprises more than one spring situated in between one less in number of intermediate spring guides each having a cylindrical midsection situated in between first and second retaining ends, said cylindrical midsection comprising a pair of annular spring seats each having an innermost wall in common with the outer diameter of said first and second retaining ends.

17. A method for advancing material stock into and through an external holding device seated in a headstock spindle assembly, said method comprising the steps of:

placing a plunger assembly into an elongate body having first and second ends and a cylindrical bore extending lengthwise thereabout defining an interior chamber, said plunger assembly comprising means for biasing a ram having a cylindrical stop situated in between a spring retainer and a shaft having an inwardly conical depression at its end for receiving an end of material stock, said cylindrical stop comprising an annular spring seat having an inner wall in common with the outside diameter of said spring retainer, said cylindrical stop comprising an outer facing wall substantially formed by the diametric difference of said cylindrical stop and said shaft, said second end comprising a retention slot for housing therein a retaining clip having an inner surface portion momentarily engaging said outer facing wall as said plunger assembly cyclically travels within said interior chamber toward said second end of elongate body;

attaching an end plug to said first end to retain axial positioning of said plunger within said interior chamber while operably moving toward and away from said first and second ends, said end plug comprising a threaded section situated in between external and internal ends thereof and a venting bore extending lengthwise thereabout to serve in equalizing pressure while said plunger assembly operably moves longitudinally within said interior chamber, said threaded section being threadably attached to a threaded portion of said first end to permit said internal end to reside within said interior chamber; and providing means for attaching said second end of elongate body to the external holding device.

18. An apparatus as set forth in claim 17, wherein said biasing means comprises more than one spring situated in between one less in number of intermediate spring guides each having a cylindrical midsection situated in between first and second retaining ends, said cylindrical midsection comprising a pair of annular spring seats each having an innermost wall in common with the outer diameter of said first and second retaining ends.

19. An apparatus as set forth in claim 17, wherein said attaching means comprises a threaded section having a thread arrangement substantially equivalent to a threaded end section of the external holding device.

20. An apparatus as set forth in claim 17, further comprising the step of engaging an end of material stock with said inwardly conical depression and movably positioning the material stock inwardly within said interior chamber until said plunger assembly is in a fully compressive state.

21. An apparatus for advancing material stock into and through an external holding device seated in a headstock spindle assembly, said apparatus comprising in combination:

a tubular housing having a distal end for receiving an end cap having inner and outer members and a longitudinal bore extending therethrough and a proximal end comprising means for attaching said tubular housing to the external holding device; and a drive assembly housed within said tubular housing and operably working longitudinally therewithin and comprising means for advancing said drive assembly to and from said distal and proximal ends.

22. An apparatus as set forth in claim 21, wherein said drive assembly comprises an elongate rod having a predetermined length and a first threaded end having a pair of locking nuts threadably attached thereto to limit the extent to which said first end extends beyond said distal end and a second threaded end having a material pusher threadably attached thereto to engage an end of material stock, said material pusher comprising a locking nut to ensure a tightened position while operably acting in conjunction with said drive assembly.

23. An apparatus as set forth in claim 21, further comprising a stabilizer sleeve having an inner opening centrally located thereabout to slidably fit over and onto said tubular housing and a pair of recessed cavities each receiving therein a set screw threadably extending inward to tighten said stabilizer sleeve to said tubular housing which collectively mitigates the occurrence of vibration while being accommodated within the headstock spindle assembly.

24. An apparatus as set forth in claim 22, wherein said advancing means comprises a spring slidably positioned about said rod and having one end abutting said pair of locking nuts at said distal end and a second end abutting said material pusher at said proximal end.

25. An apparatus as set forth in claim 24, wherein said first and second threaded ends of said rod each receive an end positioned washer to abut said spring ends.

26. An apparatus as set forth in claim 22, wherein said advancing means comprises more than one spring slidably positioned about said rod and situated in between washers having an outer diameter slightly less than the effective inner diameter of said tubular housing to ensure axial positioning of said springs during cyclic movement of said drive assembly.

27. An apparatus as set forth in claim 21, wherein said attaching means comprises a threaded section having a thread arrangement substantially equivalent to a threaded end section of the external holding device.

28. An apparatus as set forth in claim 21, wherein said attaching means comprises a keyed portion at said second end adaptably fitted to an equivalent structure made part of the external holding device, permanently being fastened to one another by a bead of weld.

* * * * *